US010387451B2

(12) United States Patent
Habouzit et al.

(10) Patent No.: US 10,387,451 B2
(45) Date of Patent: Aug. 20, 2019

(54) SYNCHRONIZATION SYSTEM FOR MULTIPLE CLIENT DEVICES

(71) Applicant: Apple Inc., Cupertino, CA (US)

(72) Inventors: Pierre Habouzit, Triel sur Siene (FR); Olivier Bonnet, Mountain View, CA (US); Jean-Gabriel Morard, Paris (FR)

(73) Assignee: Apple Inc., Cupertino, CA (US)

( * ) Notice: Subject to any disclaimer, the term of this patent is extended or adjusted under 35 U.S.C. 154(b) by 467 days.

(21) Appl. No.: 14/501,799

(22) Filed: Sep. 30, 2014

(65) Prior Publication Data

US 2015/0347552 A1 Dec. 3, 2015

Related U.S. Application Data

(60) Provisional application No. 62/005,978, filed on May 30, 2014.

(51) Int. Cl.
*G06F 16/27* (2019.01)
*G06F 16/178* (2019.01)

(52) U.S. Cl.
CPC .......... *G06F 16/273* (2019.01); *G06F 16/178* (2019.01)

(58) Field of Classification Search
CPC ........ G06F 17/30575–30578; G06F 17/30144; G06F 17/30174; G06F 17/30194; G06F 16/27–278
See application file for complete search history.

(56) References Cited

U.S. PATENT DOCUMENTS

| | | | | |
|---|---|---|---|---|
| 6,006,274 | A * | 12/1999 | Hawkins ............... | G06F 1/1626 709/248 |
| 6,810,405 | B1 * | 10/2004 | LaRue .................. | A61M 19/00 707/613 |
| 7,761,414 | B2 | 7/2010 | Freedman | |
| 7,809,682 | B2 | 10/2010 | Paterson et al. | |
| 8,417,907 | B2 | 4/2013 | Urkude et al. | |

(Continued)

FOREIGN PATENT DOCUMENTS

| | | |
|---|---|---|
| WO | 2006007498 | 1/2006 |

OTHER PUBLICATIONS

International Search Report and Written Opinion of the International Searching Authority for PCT/US2015/030016, dated Jul. 21, 2015, 14 pages.

*Primary Examiner* — Robert W Beausoliel, Jr.
*Assistant Examiner* — Nirav K Khakhar
(74) *Attorney, Agent, or Firm* — Womble Bond Dickinson (US) LLP

(57) ABSTRACT

Systems and methods are disclosed for synchronizing one or more user data sets on one or more client devices of a user, using a synchronization system. Each client device can have two independent and asynchronously-operating synchronization engines. The synchronization system can include a synchronization system manager that can resolve conflicts in data that arise from different versions of software being used generate a data set. Each client can maintain two separate databases: a first database that can contain a snapshot of the state of the user data sets across client devices, as known to the synchronization system. The second database can contain a snapshot of the local file system and information about the state of synchronization of the local file system with the synchronization system.

25 Claims, 10 Drawing Sheets

(56) References Cited

U.S. PATENT DOCUMENTS

| | | | | |
|---|---|---|---|---|
| 2004/0139125 | A1* | 7/2004 | Strassburg | G06F 11/2064 |
| 2008/0168072 | A1 | 7/2008 | Freedman | |
| 2010/0262582 | A1 | 10/2010 | Garcia-Ascanio et al. | |
| 2011/0173294 | A1* | 7/2011 | Jackson | G06F 17/30575 709/217 |
| 2012/0185434 | A1 | 7/2012 | Giampaolo et al. | |
| 2013/0282658 | A1 | 10/2013 | Besen et al. | |
| 2014/0053227 | A1 | 2/2014 | Ruppin et al. | |
| 2014/0129521 | A1* | 5/2014 | Marsden | H04W 4/02 707/623 |
| 2014/0181021 | A1* | 6/2014 | Montulli | G06F 17/30174 707/624 |
| 2014/0207734 | A1* | 7/2014 | Lin | G06F 17/30174 707/610 |
| 2015/0120657 | A1* | 4/2015 | Kwon | G06F 17/30575 707/620 |

* cited by examiner

SYNCHRONIZATION SYSTEM FOR MULTIPLE CLIENT DEVICES

RELATED APPLICATIONS

This United States patent application claims priority under 35 U.S.C. § 119(e) of U.S. Patent Application No. 62/005,978, filed May 30, 2014, and entitled "SYNCHRONIZATION SYSTEM FOR MULTIPLE CLIENT DEVICES," which is incorporated herein by reference to the extent that it is consistent with this disclosure.

TECHNICAL FIELD

This disclosure relates to the field of synchronizing data between one or more client devices and a synchronization system, and in particular, in one embodiment, to synchronizing data between a client device and synchronization system utilizing multiple asynchronously operating synchronization engines on the client device.

BACKGROUND

A user having one or more client devices, each generating one or more user data sets, may wish to store data from the client devices on a remote data storage service, such as a cloud storage service. The user would also like to synchronize the user data sets stored on each client device with the remote data storage server, thereby generating a single state of the user's data sets across the multiple client devices at the remote storage service. A cloud storage service may not provide a synchronization system that synchronizes user data sets between the user's multiple client devices. Thus, such as user needs a synchronization service, in addition to a cloud storage service.

A synchronization service must be able to resolve conflicts between different versions of a user data set, such as a contacts user data set, that are generated by different client devices. In addition, the user's client devices may not all be running the same version of a software application that generated the user data set, e.g. a contacts management software. If there are one or more incompatibilities, or bugs, between the user data generated by the different versions of the software, then a synchronization system of the prior art would store multiple different versions of the user data set: one version of the user data set for each version of the software that generated the data set. The synchronization system would then need to continue maintain each of the multiple versions of the user data set, for the same user data for each of the different software versions.

In addition, synchronization systems of the prior art often use a single synchronization database and a single synchronization engine on a client device. If the synchronization database on the client device is lost, corrupted, or reset, the client device may not be able to reliably synchronize to the last state of the user data as known to the synchronization system and the client device. The single synchronization engine can also constitute a performance choke point, making synchronization of a client device with a synchronization system less reliable and of lower performance. Further, tunable parameters of the client device synchronization engine of the prior art, such as the frequency with which synchronization occurs, are controlled by the synchronization system, not by the client device synchronization engine. Tunable synchronization parameters are adjusted by the synchronization system for the optimization of the synchronization system, not the client device.

SUMMARY OF THE DESCRIPTION

Embodiments are described of a system for synchronizing one or more user data sets on one or more client devices with a single unified view of the user's data sets across devices. In one embodiment described herein, a synchronization system can include one or more contents servers, a metadata server, and a synchronization system manager. A user can have multiple client devices that each can synchronize one or more user data sets to the synchronization system. In one embodiment, metadata describing the user data sets can be stored on the metadata server while the contents of the user data sets can be stored on the contents server. In one embodiment, the actual files, folders, and packages that make up a user's data sets can be stored on the contents server, while metadata describing the user's data sets can be stored on a metadata server. The metadata server can maintain a current, single unified view of the user's data sets across the client's multiple devices.

In one embodiment, the synchronization system can resolve incompatibilities between versions of a user data set, e.g. a contacts data set, arising from the user data set being generated or modified using different versions of an application. The synchronization system manager can detect incompatibilities between versions of a user data set and apply software patches and data modifications to resolve the incompatibilities. In one embodiment, the synchronization system manager can resolve incompatibilities between different versions of a user data set due to the different versions being generated or modified using different software applications, as distinguished from different versions of the same software.

In an embodiment, a client device can include two independent, asynchronously operating synchronization engines. Each synchronization engine can maintain its own synchronization database. In one embodiment a synchronization up ("synch up") engine can connect to the synchronization service and upload changes to the user data sets on the client device file system. The synch up engine can maintain a database that represents a snapshot of the state of the file system on the client device. In an embodiment, the synch up snapshot can include metadata describing the file system on the client device and metadata describing the synchronization state of the file system on the client device. In one embodiment, the synch up engine can control the frequency at which the synch up engine synchronizes up to the synchronization system, independent of synchronization timing maintained by the synchronization system. The client device can also include a synchronize down ("synch down") engine. The synch down engine can operate independently, and asynchronously, from the synch up engine. In an embodiment, the synch down engine can synch down twice, without an intervening synch up by the synch up engine. The synch down engine can maintain a database on the client containing data that represents a synch down snapshot of the state of the user's data sets as known to the synchronization system. In one embodiment, the synch down snapshot can include metadata describing the state of synchronization of the user data sets.

In one embodiment, if the synch up snapshot on the client device is lost, corrupted, or reset, the synchronization system and the client device can regenerate the synch down snapshot utilizing the client file system and synch down snapshot. In one embodiment, if the sync down snapshot on the client device is lost, corrupted, or reset, the synch down engine can synchronize down the synch down snapshot from the synchronization system. In an embodiment, if the client file system is lost, corrupted, or reset, the client device and the synchronization system can rebuild the client file system utilizing the synch up snapshot, the synch down snapshot of the metadata server, and the contents server.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for a client device having two independent, asynchronously operating synchronization engines to synchronize one or more user data sets between the client device and a synchronization system. The synchronization system can store a single state of all of a user's data sets across multiple client devices of the user.

Figure 1:
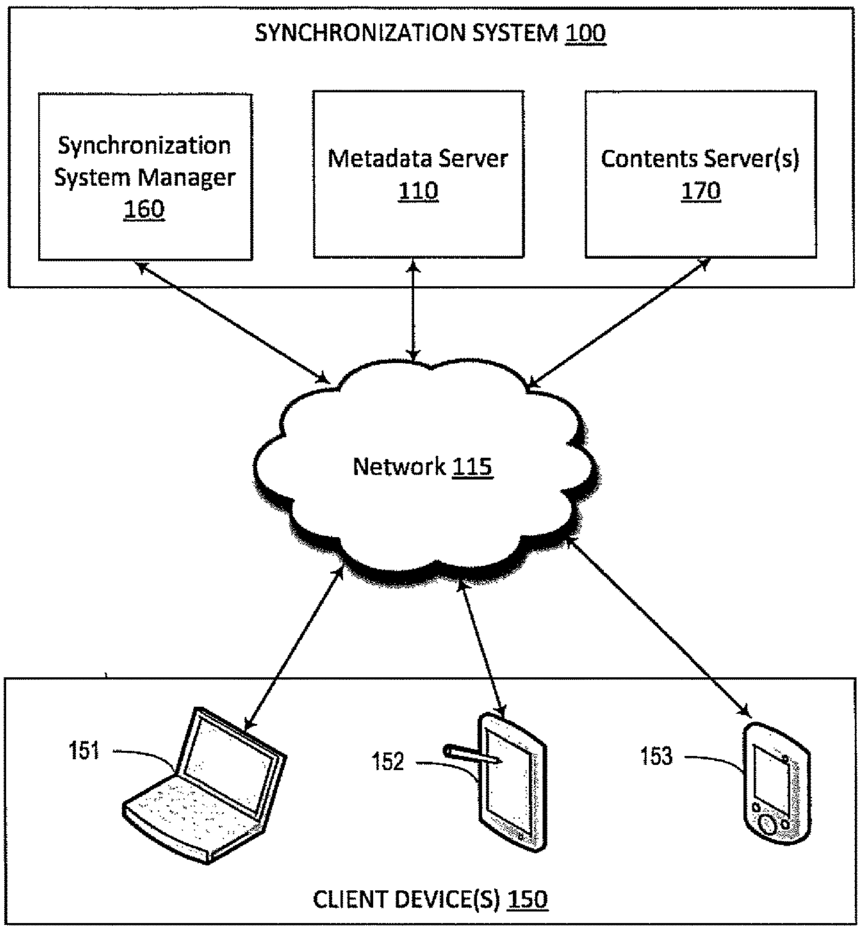
FIG. 1 illustrates a block diagram of an overview of a system for synchronization of multiple client devices of a user utilizing a remote synchronization service.

FIG. 1 illustrates a block diagram of an overview of a synchronization system 100 for synchronizing one or more data sets between one or more client devices 150 of a user utilizing the synchronization system 100.

The synchronization system 100 can include a metadata server 110 and one or more contents servers 170. In one embodiment, a contents server 170 can store one or more types of user data sets. For example, an iTunes® contents server 170 can store licensed assets such as songs, movies, and other streaming content. Another contents server 170 can store, e.g., a contacts user data set, while still another content server 170 can store emails of one or more email accounts of a user. In an embodiment, a content server 170 can be a cloud storage service capable of storing a wide variety of different user data set types. In one embodiment, the synchronization system 100 can further include a synchronization management system 160. Initially, a client device 150 can store one or more user data sets from the file system of the client device 150 on the synchronization system 100. A user data set, such as a file of contacts from an address book or contacts application on the client 150, can be stored on the synchronization system 100. In one embodiment, the user data set can be chunked into chunked data portions and stored on the one or more contents servers 170. Metadata describing the user data set and metadata about the chunked portions of the user data set can be stored on the metadata server 110 in a synchronization metadata database. In one embodiment, the metadata server 110 and contents server 170 can be managed using a synchronization management system 160. Managing the metadata server 110 can include providing software to the metadata server 110 to resolve conflicts between various versions of data sets of a user, including conflicts resulting from different versions of a software that generated a data set. For example, if one client device of a user, e.g. 151, has word processor software that is version 2.0, and the user generates a word processing document using that client device and software, and the document is later downloaded using the synchronization system 100 to a different client device of the user, e.g. 152, having version 1.0 of the word processor software, the version 1.0 software may not be able to open and/or edit the document that was generated by software version 2.0. Synchronization system manager 160 can provide software updates and patches to the metadata server 110 to adapt the document for use with both version 1.0 and version 2.0 of the word processing software.

The synchronization system 100 can be interfaced to the client device(s) 150 via a network 115. The network 115 can be the Internet, a wireless network, a cellular network, a local area network, or any combination of these. Although the synchronization system manager 160, metadata server 110, and contents server 170 have been shown as separate elements, connected via a network 115, this need not be the case. One or more of the synchronization system manager system 160, metadata server 110, or contents server 170 can be implemented on the same host computer system or on several physically distributed computer systems. In addition, as described above, contents server 170 can include one or more content servers 170, any or all of which can store one or more types of user data sets. Communication between one or more of the synchronization system manager 160, metadata server 110, and contents server(s) 170 can be by sockets, messages, shared memory, an application program interface (API), inter-process communication, or other processing communication service. Application programming interfaces are described in detail, below, with reference to FIG. 9.

A client device 150 can include a desktop computer system, a laptop computer system such as client device 151, a tablet computer system such as client device 152, a cellular telephone such as client device 153, a personal digital assistant (PDA) including cellular-enabled PDAs, a set top box, an entertainment system, a gaming device, or other consumer electronic device. The components of a client device 150 are described in detail, below, with reference to FIG. 10.

A user data set can include one or more of: a data file, a folder or directory, a word processing document, a spreadsheet, a presentation, emails, texts, user contacts, bookmarks, assets such as music, movies, and other purchased content, device settings, and application settings. Each of these can be a user data set. A user of a client device 150 can determine, on a per-device basis, whether a particular data set will, or will not, be synchronized with other of the user's client devices 150 using the synchronization system 100.

Metadata about user data sets can include file system metadata and synchronization metadata. File system metadata can include a file ID, such as a POSIX file ID, a document ID, a creation date of the file, a date that the file was last modified, an identifier of the device that last modified the file, an identifier of the application and version of the application that modified the file, and a generation count for the file. For assets, such as purchased content that are already stored remotely at a service such as iTunes® or Amazon Cloud®, metadata about the content can include a Universal Resource Locator (URL) that points to where the content is located. File system metadata can be generated by the file system of each client device 150. Synchronization metadata can include a universally unique identifier (UUID) for a file or a directory that is unique across the client devices 150 of a user, and can further include ETAGS. ETAGS can specify a specific version of the metadata for a document or a directory. ETAGS can be generated by the synchronization system 100 to manage the user data sets and resolve conflicts between differing generations of user data for a particular user data set. For example, an ETAG can be used to distinguish different generations of a word processing document of the resumé of the user.

Figure 2:
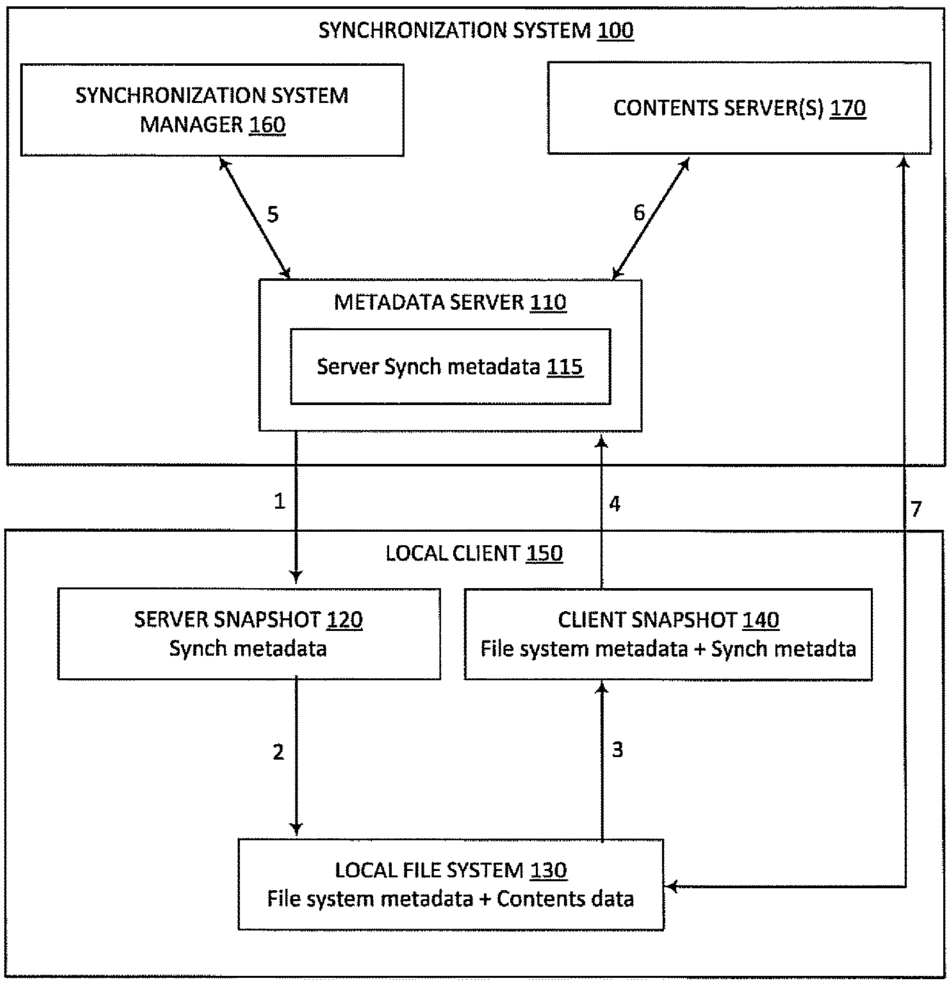
FIG. 2 illustrates a block diagram of a synchronization system for synchronization a device of a user to a remote synchronization service.

FIG. 2 illustrates a block diagram of a synchronization system 100 for synchronization a client device 150 of a user to the synchronization system 100. The metadata server 110 can contain synchronization metadata about one or more user data sets that are stored on the synchronization system 100. In one embodiment, contents server(s) 170 can store the user data set(s) and metadata server 110 can store the synchronization metadata discussed above with reference to FIG. 1. Metadata server 110 can communicate with synchronization system manager 160 via communication interface 5. Metadata server 110 can also communicate with the contents server(s) 170 via communications interface 6. Communications interfaces 5 and 6 can be network interfaces, utilize messaging, shared memory, sockets, interprocess communication, or APIs. In one embodiment, communications interface 5 and 6 can be a different communications interface type from one another.

Client device 150 can include two separate and independent synchronization engines. One synchronization engine can synchronize the server synchronization metadata 115 down to the server snapshot 120 (on the client) of the server synchronization metadata 115 via communication interface 1. The other synchronization engine can synchronize a client device snapshot 140 of the file system 130 up to the server synchronization metadata 115 via communication interface 4.

Synchronization metadata downloaded to the server snapshot 120 of the client 150 can specify changes that are to be applied to the local file system 130 via interface 2. Changes to the local file system 130 can generate file system metadata that is stored in the client snapshot 140 of the file system 130 via communication interface 3. The local file system 130 can change as a result of a user of the client device 150 making a change to a file in a data set, such as editing a contact in a data set of contacts or creating a new document in a word processor. Changes to the local file system 130 can also occur as a result of the local file system 130 being updated to reflect changes to the user data set(s) in the synchronization system 100, according to the server snapshot 120 downloaded from the server metadata database 115. In addition to generating file system metadata, changes to the local file system 130 can also generate user data set content that is uploaded to the content server(s) 170 via communication interface 6.

Figure 3:
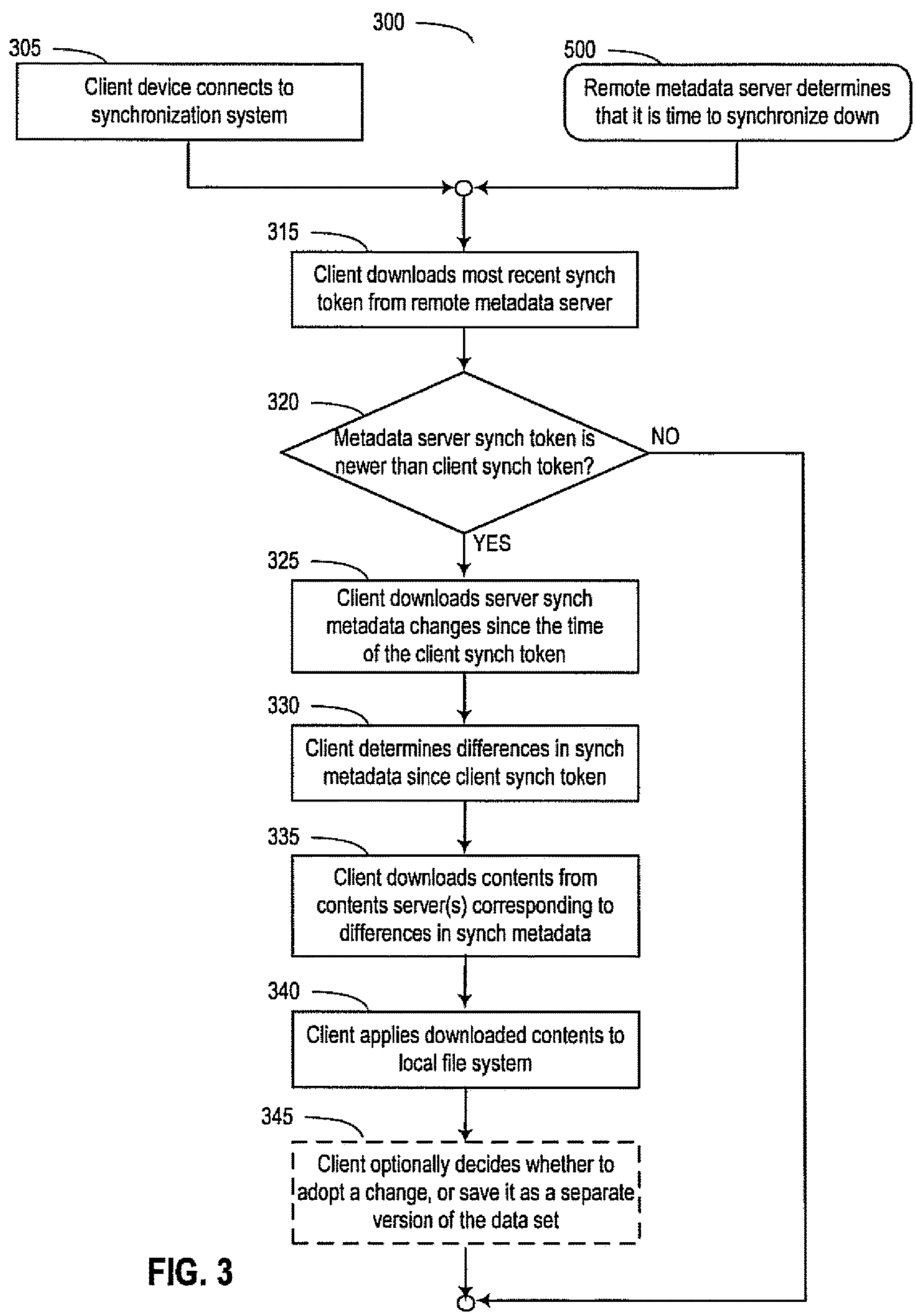
FIG. 3 illustrates a block diagram of a method for synchronizing one or more data sets stored by a synchronization system down to a client device.

FIG. 3 illustrates a block diagram of a method 300 of synchronizing down, to a user client device, one or more user data sets that are stored by a synchronization system 100.

The server synch metadata 115 can have a synchronization token ("server synch token") for each time a synchronization operation was performed between the synchronization system 100 and a client device 150. The server snapshot 120 of synchronization meta on each client device 150 can have a synchronization token ("client synch token") corresponding to each time that a synchronization operation was performed between the synchronization system 100 and the client device 150. Since multiple client devices 150 of a user can perform a synchronization operation with the synchronization system 100, the synchronization system 100 can maintain the most recent state of the data sets of the user across the multiple client devices 150 of the user. Accordingly, the synchronization system 100 can have a "most recent" server synch token that will be "newer" (more recent) than a client synch token on a client device 150.

A synch token, whether it be a server synch token or a client synch token, can have a time attribute that represents the time at which a synchronization operation was performed between a client device 150 and the synchronization system 100. In one embodiment, a synch token can also have a data type attribute that can be a single-valued, or a multi-valued attribute, representing the data type of one or more user data sets that were synchronized during a synchronization operation. A synch token having a data set type can provide one way for a client to selectively control synchronization of user data set(s). The synch token can also have an attribute that identifies the device type being synchronized, and attributes of the device such as available memory, processing power, disk storage and communication bandwidth.

In addition, in an embodiment, a synch token can have an attribute representing synchronization frequency criteria. The synchronization frequency criteria can be different for each user data set. In an embodiment, the synchronization frequency criteria can be the same for all user data sets. In an embodiment, the synchronization frequency criteria can include at least one of: a time interval that defines an update frequency, a number of data items to synchronize per synchronization, a data size, e.g. a quantity of bytes, to synchronize per synchronize operation, or a combination of these. A client device 150 can request that the synchronization system 100 utilize the synchronization criteria specified within a client synch token for synchronize down operations. The synchronization system 100 can determine whether to use the requested synchronization frequency criteria, whether to adjust the synchronization frequency criteria, or whether to ignore the synchronization frequency criteria. In one embodiment, the synchronization system 100 can inform the client device 150 of the synchronization frequency criteria that the metadata server is using for synchronize down operations in a server synch token in a synchronize down operation. The client device 150 can control its own synchronize up timing independently of the synchronize down timing used by the synchronization system 100. The synchronization system 100 can utilize a default set of synchronize down frequency criteria independent of whether a client device 150 requests a specific synchronization down frequency criteria. In one embodiment, the synchronization frequency criteria can be transmitted between the synchronization system 100 and the client device 150 using a communication link between them, and a message, rather than utilizing a synch token to transmit the synchronization frequency criteria.

In operation 305, the method 300 of synchronizing down to a client device begins when a client device 150 of the user connects to the synchronization system 100. The method 300 can also begin at a time, or under circumstances, determined by the synchronization system 100, as described below with reference to FIG. 5.

In operation 315, the client device 150 can download the most recent server synchronization token ("synch token") from the metadata server 110. The metadata server synch token can represent the most recent snapshot of the user data set(s) for a user across all of the client devices 150 of the user that have previously synchronized their user data sets with the synchronization system 100.

In operation 320, the user client device 150 can determine whether the downloaded server synch token is more recent than a client synch token for the user data set(s) to be synchronized. A downloaded server synch token can be "more recent" than a client device synch token when the client device synch token is not found. The client device synch token may not be found if, e.g., the client device has never been synchronized with the synchronization system 100 or the client device synch metadata snapshot 120 has become lost, reset, or corrupted.

If the downloaded server synch token is more recent than the client synch token, then in operation 325 the client device 150 can download changes in the synchronization metadata from the remote metadata server 110 that have occurred since the time of the client synch token.

In operation 330, the client device 150 can determine differences in synchronization metadata between the synchronization metadata downloaded from the metadata server 110 and the server snapshot 120 of synchronization metadata stored on the client device 150. Each of the determined differences in synchronization metadata can have a corresponding change in user data set contents stored at the contents server 170.

In operation 335, the client device 150 can download user data set contents from the contents server 170 corresponding to the determined differences in the synchronization metadata. In some embodiments, for some user data sets, e.g. for content assets such as music, video, and other streaming content, one or more items of content in the user data set can remain on the contents server(s) 170 and not be downloaded to the client device 150. In such embodiments, the client device 150 may, alternatively, synch down only a portion of the content differences from the contents server(s) 170 to, e.g., quickly begin, or "bootstrap," the streaming of a content item on the client device 150 during playback, so that additional portions of the content item can be downloaded to the client device 150 while the bootstrap portion of the content item is being played on the client device 150. In an embodiment, the client device 150 need not synch down the content differences from the content server 170 for one or more user data set types. Instead, the client device 150 can use metadata in the metadata snapshot 120 to retrieve a content item of a user data set from the content server(s) "on demand" from the contents server(s) 170.

In operation 340, the client device 150 can apply the changes to the user data sets stored on the client device file system 130 using the determined differences in the synchronization metadata and the downloaded user data set contents, thereby updating the client device file system 130 to the state of the user data sets as stored in the synchronization system 100. As described more fully below, with reference to FIG. 6, the client device can make one or more decisions not to update the file system to exactly correspond to the synchronization system state of the user data sets.

In one embodiment, conflicts between versions of user data sets can be handled primarily by the synchronization system 100, as described below with reference to FIG. 8. In the rare instance when the synchronization system 100 cannot resolve a conflict between versions of a user data set, in operation 345, the client may optionally resolve a conflict in one or more changes to be applied to the client device file system 130. In one embodiment, a user can decide to save two versions of a user data set on the client device 150 to resolve a conflict. In an embodiment, a user can decide to drop a change to be applied to the file system 130 such that the change is not applied to the user file system 130. A dropped change can be flagged and reflected in an update to the client snapshot 140 of the local file system 130.

Figure 4:
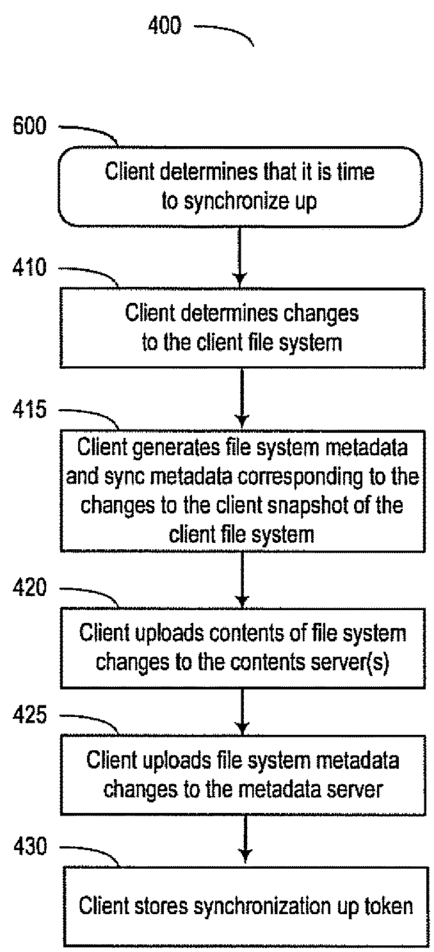
FIG. 4 illustrates a block diagram of a method for synchronizing one or more user data sets on a client device file system up to a synchronization system.

FIG. 4 (Synch-Up) illustrates a block diagram of a method 400 for synchronizing one or more user data sets on a client device file system up to a synchronization system 100.

In operation 600, the client device can determine whether it is time to perform a synchronization of the client snapshot 140 of one or more user data sets on the client file system 130, up to the synchronization system 100. Operation 600 is described in detail with reference to FIG. 6, below.

In operation 410, the client device 150 can determine changes made to the user data sets on the file system 130 since the last synchronize down operation. The synchronize down operation is described in method 300 with reference to FIG. 3, above. In one embodiment, determining the changes to the user data sets can include analyzing the file system metadata stored by the client snapshot 140 of the file system 130. Changes to the file system metadata can be made in response to file system change events as changes to a user data set on the client device file system 130 are being made. Changes to a user data set can be made during a synchronize down operation, or by a user adding, modifying, or deleting data in a user data set on the client device file system 130. In another embodiment, changes to the file system 130 can be determined by performing a scan of the file system 130 to search for changes to the file system 130 as compared against the synch metadata stored in the server snapshot 120 of the synch metadata on the client device 150.

In operation 415, the client device 150 can generate file system metadata and synchronization metadata corresponding to the changes to the user data sets in the file system 130. In one embodiment, file system metadata and/or synchronization metadata can alternatively be generated in response to a change being applied to a user data set in the client device file system 130 as a result of a synch down operation 300. In such an embodiment, operation 415 need not be performed since it would be redundant to the file system and/or synchronization metadata generated in response to a change being applied to the user data as a part of a synch down operation. In another embodiment, operation 415 may be performed in addition to generating file system metadata and/or synchronization metadata as a validity check on a previous change to the file system and/or synchronization metadata generated in response to a change applied to the user data sets during a synch down operation 300.

In operation 420, the client device 150 can upload changes to the user data sets on the file system 130 to the contents server(s) 170. In one embodiment, the client device 150 can upload an entire copy of one or more user data sets instead of, or in addition to, uploading only the changes. In one embodiment, the choice as to whether to upload changes only, or an entire data set, can be configured on the client device 150. In one embodiment, the choice to as to whether to upload changes only, or an entire data set, can be configured on the client device 150 on a data set-by-data set basis. In some embodiments, changes to different user data sets can be uploaded to different content server(s) 170. In some embodiments, changes to some types of user data sets, e.g. licensed or purchased content media assets, may not have been downloaded to the client device 150 during a synch down because the content is always maintained at a content server 170, such as iTunes®. In such case, in an embodiment, a synch down operation can download only a portion, e.g. a first few seconds, of a content media asset to facilitate a quick start of a streaming process. The portion of a content asset that was downloaded to facilitate streaming need not be treated as a change that needs to be synched up to the contents server(s) 170 because the entire content media asset of the user data set is already maintained at the contents server(s) 170.

In operation 425, the client device 150 can upload file system metadata changes and synchronization metadata changes to the metadata server 110. By uploading the contents of file system 130 changes to the contents server 170 before uploading the corresponding file system metadata and synchronization metadata, a client device 150 is assured that the most recent changes to content on the file system 130 are uploaded to the synchronization system 100, even if the upload of the file system metadata and/or synchronization metadata fails or is lost locally on the client device 150. From the uploaded changes to content, a valid file system 130 can be generated on the client 150, even if the file system metadata and/or synchronization metadata is lost, reset, or corrupted.

In operation 430, a client synch up token can be generated and stored on the client device 150. The client device 150 can generate the client synch up token. In one embodiment, the metadata server 110 can generate a synch up token and pass the synch up token to the client device 150, and the client device 150 can store the synch up token.

In some embodiments, the operations above may be performed in a different order. For example, the client determination that is it time to perform a synch up operation 405 can be made in response to the client device 150 collecting a certain number of changes to the file system of operation 410. In one embodiment, the client device 150 can upload file system metadata and/or synchronization metadata before uploading content changes to the contents server 170. However, as explained above, there are advantages to uploading file system content changes to the contents server 170 before uploading metadata corresponding to the file system changes.

Figure 5:
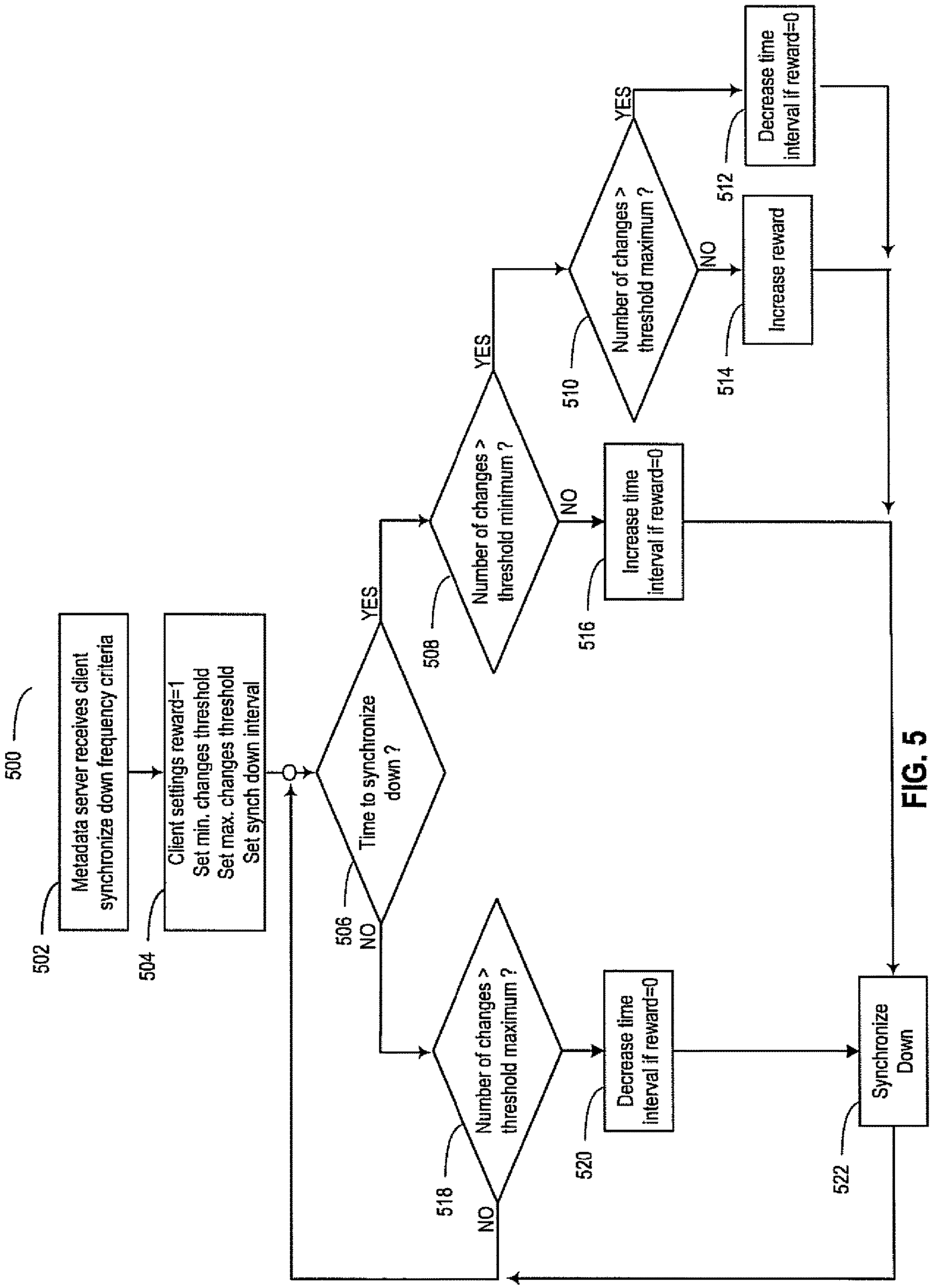
FIG. 5 illustrates a block diagram of a method for a synchronization system to determine the frequency with which synchronize down operations are performed.

FIG. 5 illustrates a method 500 of a synchronization system 100 determining the frequency with which synchronize down operations are performed. Synchronize down operations are described in detail, above, with reference to FIG. 3.

A synchronize down operation can be performed at a time that is determined from a timing frequency counter, a number of data items to be synchronized down, the quality of service of a communication line between the synchronization system 100 and a client device 150, and other parameters.

A synchronize down operation can involve the transmission of a number of metadata records in the metadata server 110, transmission of a number of contents data records in the contents server 170, communications overhead for the transmission, and processing overhead for updating the metadata server 110 and contents server 170. A method 500 of determining a synchronize down frequency can take into account the overheads of performing a synch down operation, and balance these overheads against the resources required if the synch down is not performed. If a synch down is not performed, the metadata server 110 and contents server 170 can store pending updates to one or more user data sets that are to be synchronized down. The longer that the synchronization server holds pending updates to be synch'd down, the longer the client devices 150 are out of date with respect to the pending updates.

The following method 500 illustrates, in block diagram form, an embodiment for the synchronization system 100 to determine when to synchronize down. Although the term, "frequency," has been used, it will be clear from the description below that the time interval and circumstances under which a synchronize down operation are performed is in the control of the synchronization system 100 and can vary during the time that a client device 150 is connected to the synchronization system 100. The timing of synchronize up operations is in the control of the client device 150 and is discussed below with reference to FIG. 6.

In operation 502, the metadata server 110 of the synchronization system 100 can receive client synchronize down frequency preference information from the client device 150. As described above, with reference to FIG. 4, the client synchronization down frequency preference information can be received in a synch up token from the client during a synch up operation.

The synchronization system 100 can implement a reward variable that tracks occurrences of when the client preference information coincides with the synchronization system's determination that it is time to synch down. When the synchronization system 100 determines that a synch down operation should happen, and the synchronization system 100 determination that a synch down operation should happen coincides with the client device preference information, the synchronization system 100 can increase the reward instance variable. When the synchronization system determines that a synch down operation should happen, and the determination does not coincide with, or fall within a tolerance of, the client device preference information, then the synchronization system 100 can adjust a time interval that helps determine when a synch down should occur. If the reward instance value is greater than zero, the synchronization system 100 can opt not to adjust the time interval that helps determine when a synch down operation should occur.

In operation 504, the synchronization server can set an initial value for the client reward instance variable. In an embodiment, the initial value for the client reward instance variable can be one (1). Other values can be used. The synchronization system 100 can set a minimum number of changes to be received before a synch down operation will be performed. This value can be configured by the synchronization system manager 160. The minimum threshold number of changes can keep the synch down operation from happening too frequently, such as when a synch down timer has expired, indicating it is time for a synch down, but there are fewer than a minimum number of changes to synch down. When there are fewer than a minimum number of changes to synch down, the synchronization system 100 can choose not to synch down even if the interval time for synch down has expired. The synchronization system 100 can set a maximum number of changes to receive before a synch down operation so that the synchronization system 100 does not accumulate a number of changes that will take a long time to synch down, or that take a large amount of storage to store before synching down. The synchronization system 100 can further include a synch down timer to set an interval of time when a synch down operation should occur. In an embodiment, the initial values for the above variables can be determined from the last synch up token from the client. In another embodiment, the initial value for the above variables can be set by a default value in the synchronization system 100. The synchronization system manager 160 can monitor synch down operations, and monitor and set each of the above threshold and timing variables.

In operation 506, the synchronization system 100 can determine whether it is time to perform a synch down operation, based upon an interval timer.

If, in operation 506, it is time to perform a synch down operation, then in operation 508 the method can determine whether the number of changes to the user's data sets that have been received is greater than the threshold minimum number of changes that should be included in a synch down.

If, in operation 508, the number of changes is greater than the minimum threshold, then in operation 510, the synchronization system 100 can determine whether the number of changes to the user's data sets that have been received is greater than the threshold maximum number of changes that the synchronization server deems too many for a synch down operation.

If, in operation 510, the number of changes is greater than the maximum threshold, then in operation 512 the synchronization system 100 can decrease the time interval so that a synch down operation will happen sooner, so that fewer changes would be accumulated for the next synch down operation. The synchronization system can also decrease the client reward instance value for accumulating more than the maximum threshold of changes for a synch down operation. In one embodiment, if the client reward instance value is greater than zero (0), then synchronization system 100 may opt to not decrease the synch down interval timer.

If, in operation 510, the number of changes for synch down is less or equal to the maximum threshold (and, by operation 508, more than the minimum threshold), then in operation 514 the client reward instance value can be increased so that preference will be given to the last used variables for synch down.

If, in operation 508, the number of changes accumulated for synch down is less than a minimum threshold value at expiration of the timer interval in operation 506, then the synchronization system 100 can opt to increase the timer interval so that more changes are accumulated before the next synch down operation. In one embodiment, the synchronization system 100 can opt to decrease the client reward instance value for not having accumulated enough changes for a synch down operation.

If, in operation 506, it was determined that it is not yet time (according to the interval timer) to perform a synch down operation, then in operation 518 it can be determined whether the number of changes accumulated for a sync down operation is greater than the maximum threshold value.

If, in operation 518, the number of changes accumulated for synch down is greater than the maximum threshold value, then in operation 520 the synchronization system can decrease the timer interval so that the next synch down operation should accumulate fewer changes for a synch down. In one embodiment, the synchronization system 100 can opt to decrease the client reward instance value for having accumulated too many changes for synch down.

If, in operation 518, the number of changes accumulated is less than or equal to the maximum threshold, then the method can resume at operation 506.

After any of operations 512, 514, 516, and 520, then in operation 522 the synchronization system 100 can perform a synch down operation, then continue at operation 506.

The above method 500 has been described using a control loop that is governed by modifying a timer interval based on accumulated changes. However, this need not be the case. In one embodiment, the method can be implemented by increasing or decreasing the minimum and maximum threshold number of changes that the synchronization system will accumulate for synch down. In addition, the synchronization system 100 can monitor communication line quality with a client device 150 and adjust the number of synchronization changes and timer interval taking into account whether all accumulated changes can be transmitted to the client device 150 within a specified time interval. If all of the accumulated changes to be synch'd down cannot be transmitted to the client during a specified time interval, then in one embodiment the synchronization system 100 can skip one or more synch down intervals at operation 506, until all of the accumulated changes have been synch'd down to the client 150. Then the method 500 of controlling synch down timing can resume as described above.

In one embodiment, each synch down token from the synchronization system 100 can include one or more synchronization frequency criteria so that the client device can learn the synch down operation criteria being used by the synchronization system 100. The client synch up operation, described below with reference to FIG. 6, can use the synch down frequency criteria to conform the client's own synch up time to the synchronization system 100. But this need not be the case. As will be described in more detail below, the synchronization system 100 can take into account, on a per-device basis, any resource limitations of a client device, such as memory, processing power, disk storage, and communication bandwidth and cost. For example, a user may choose not to synch up or down a smart phone device while it is connected to a cellular network where data usage costs may apply, and may opt to wait until the smart phone is connected to a Wi-Fi network where costs are more moderate and bandwidth is higher. The synchronization system 100 can learn these attributes from one or more synch up tokens received from the client device 150.

In addition to the above synch down intervals that are controlled by the synchronization system 100, in one embodiment the client device 150 may manually request an immediate synch down operation by a user interface event on the client device. A user interface event can include a gesture on a touch screen, a touch pad, a keystroke, or a keypress or button press, on the client device 150. In one embodiment, the synchronization system 100 can detect that the client device 150 is either not connected to the synchronization system 100, or that the client device is connected to an expensive communication link, such as a cellular link. If one of these events occur, the synchronization system 100 can send the client device an SMS message, email, or other relatively inexpensive communication, indicating that changes to one or more user data sets are pending at the synchronization system 100. In one embodiment the communication indicates the user data sets for which updates are pending.

Figure 6:
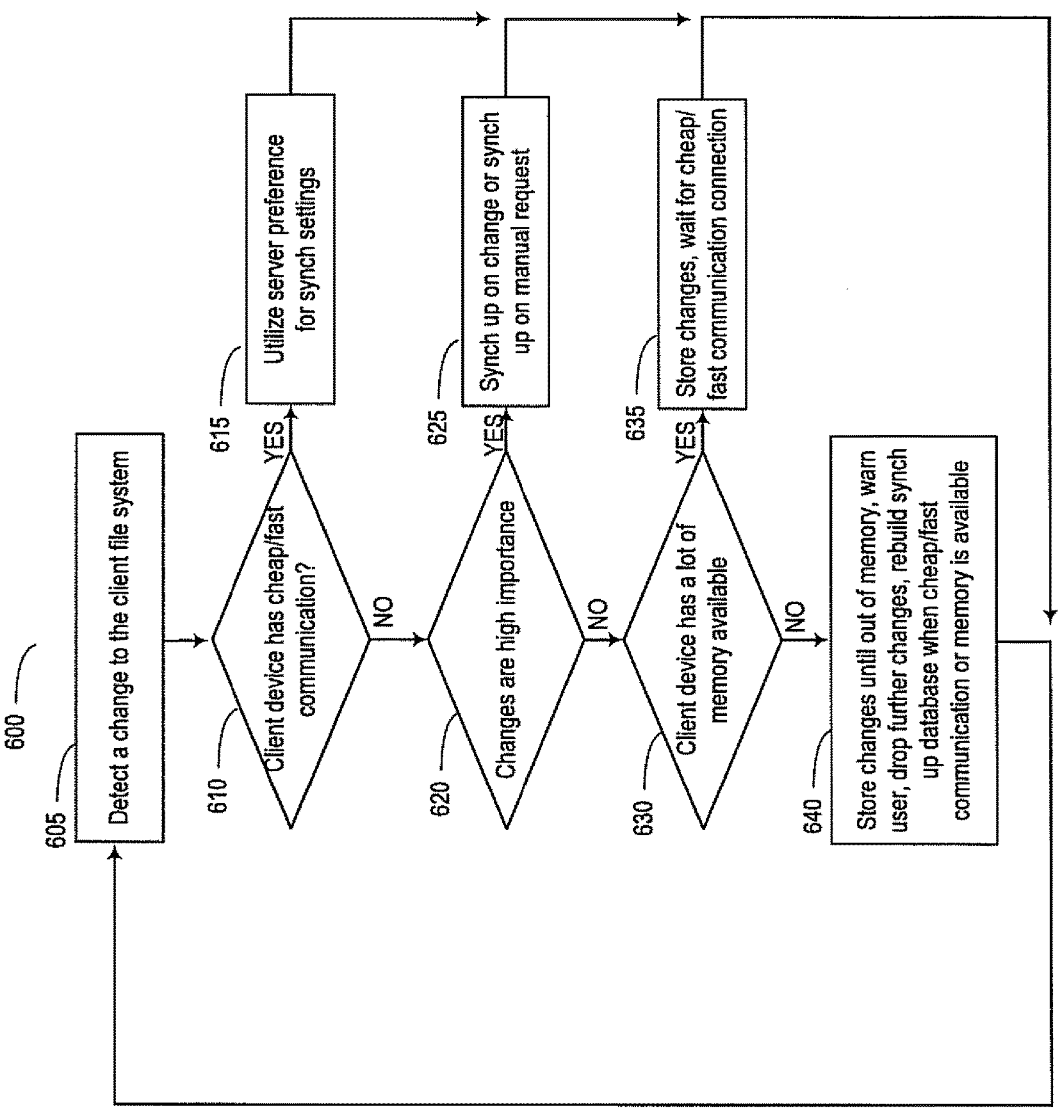
FIG. 6 illustrates a block diagram of a method for a client device to determine the frequency with which synchronize up operations are performed.

FIG. 6 illustrates a block diagram of a method 600 for the client device 150 to determine when a synch up operation should occur.

The synchronization system 100 may have substantial computing resources available for synch operations, including processing power, memory, disk storage, and communication bandwidth. This often will not be the case for client devices. Thus, a client device 150 may choose to perform a synch up operation more frequently than the synchronization system 100, based upon a limited amount of memory available on the client device 150 for storing changes to synch up. In one embodiment, a client device may opt to store pending updates for synch up, or update less frequently, when the communication device is utilizing an expensive or slow communication medium. As described above, with reference to FIG. 3, these attributes of the client device 150 can be passed to the synchronization system 100 in a synch up token.

In one embodiment, in operation 605, a client device can detect that a change to the client file system 130 has occurred.

In operation 610, the client device can determine whether it has a cheap, fast communication link available to it. A cheap, fast communication link can include a Ethernet connection, such as 802.11 b, a WiFi connection such as 802.11 g or n, or other high bandwidth, low cost connection. In an embodiment, a user can configure each of his client devices with a list of communication links that are now, or can be, available to the client device that the user deems to be cheap and fast communication links. The list of communication links that the user deems to be cheap and fast can vary between the user's client devices. For example, the user may have one client device that has access to an unlimited cellular data link, while another of his client devices does not.

If, in operation 610, it is determined that the client device is connected to a cheap/fast communication link, then in operation 615 in one embodiment the client device 150 can adopt the synchronization system synchronization frequency preference information. As described above, in one embodiment, the synchronization frequency preference information can be passed as attributes of a synch token.

If, in operation 610, it is determined that the client device is not connected to a cheap/fast communication link, then in operation 620 the client device 150 can determine whether the change(s) detected in operation 605 are of high importance to the user. In one embodiment, the user can configure each client device with a list of one or more user data sets that the user deems to be important, such that a change made to the file system should be synch'd up even of the user does not have access to a cheap, fast communication link.

If, in operation 620, it is determined that the changes made to the file system of the client device are of high importance, then the client device 150 can be configured to either synch up on receipt of a change or to accumulate changes for synch up until a user causes a manual synch up to be performed. A manual synch up can be initiated by a user interface event such as a touch screen gesture, a keypad press, a button press, and the like.

If, in operation 620, it is determined that the changes made to the file system are not of high importance, then in operation 630 it is determined whether the client device 150 has enough memory available to store further changes to a user data set.

In operation 635, the client device 150 can store changes to the file system and wait for a cheap, fast communication connection or a manual request to synch up.

If, in operation 630, it was determined that the client device 150 does not have much memory available to store changes to the file system, then in operation 640 the client device 150 can be configured to store changes to the file system for later synch up, until the client device is within a threshold value of being out of memory for storing changes to the file system, then warn the user that future changes to the file system will be dropped. If changes to the file system are dropped, then the client snapshot 140 of the state of the file system 130 will be out of date and will need to be dropped and regenerated at a later date.

The method continues at operation 605.

The above operations represent one method 600 of determining the frequency of client synch ups. The method is enabled by the ability of the client device to regenerate the client snapshot 140 of the file system 130 and synch up data. This is described in detail below, with reference to FIG. 7.

Figure 7:
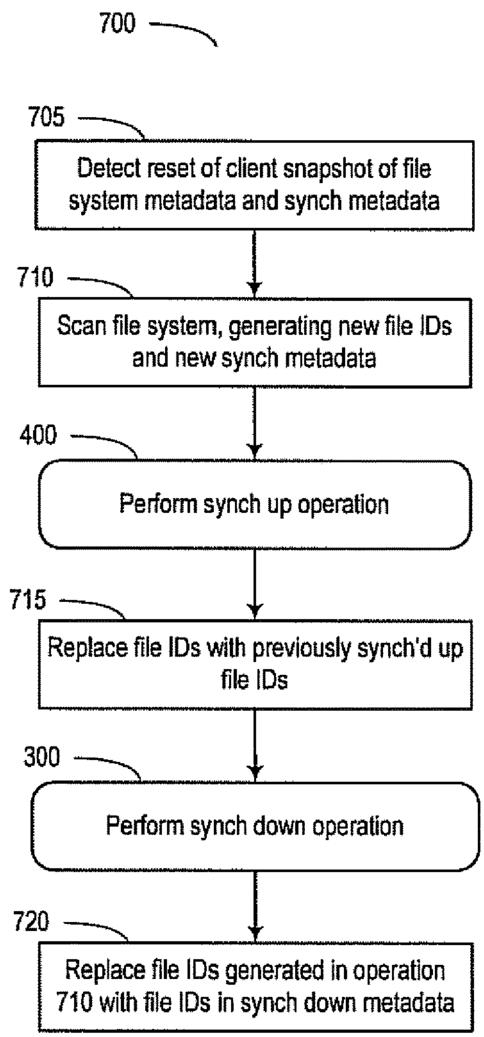
FIG. 7 illustrates a block diagram of a method of regenerating the client snapshot of the user data with respect to the synchronization system.

FIG. 7 illustrates, in block form, a method 700 of regenerating the client snapshot 140 of the user data with respect to the synchronization system 100. The client snapshot 140 of the user data set includes file system metadata generated from the file system 130 of the client device 150. The client snapshot 140 also contains synch meta that should coincide with the state of the user data as it is known to the synchronization system 100, as modified by any changes to the local file system 130 that have not yet been synched up to the synchronization system 100.

In operation 705, the client device 150 can detect that the client snapshot 140 of the file system that contains file system metadata and synch metadata has been reset, lost, or corrupted. In response to the detecting, the client device can 150 drop, delete, or otherwise discard the client snapshot 140.

In operation 710, the client device 150 can regenerate the file system metadata by generating new file identifiers (file IDs) for the client device 150 for the files. The file IDs are the file IDs as known on this particular client device 150. A different client device of the user may have a different file ID on that different client device for the same user data. The synchronization system 100 can keep a unique identifier (unique ID) for all data sets of the user, that is unique across all devices. Each filed ID on a client device has a corresponding unique ID such that the same file, on different client devices, has the same unique ID, while the same file may have a different file ID on different client devices 150.

After operation 710, a synch up operation 400 can be performed. The synch up operation is described with reference to FIG. 4.

After the synch up operation 400, in operation 715 the synchronization system 100 can determine that the synch up files are not changes to a user data set because the synchronization system 100 can identify the synch up files from their unique IDs and can identify their state from the file system metadata and synchronization metadata. Also in operation 715, the synchronization system can replace the new file IDs generated in operation 710 with the old file IDs as known to both the client and the synchronization server, prior to the reset of the client snapshot 140 detected in operation 705.

The client device 150 can then perform a synch down operation 300 as described above, with reference to FIG. 3. The synch metadata received by the client device 150 during the synch down operation 300 has the old file IDs and the unique IDs corresponding to the old file IDs. The client device 150 can store the synch metadata received during the synch down operation as the server snapshot 120 stored on the client device 150. The server snapshot 120 can represent the state of the user data sets as known to the synchronization system 100.

In operation 720, the client device 150 can replace the new file IDs that are in the client snapshot 140 on the client device 150 with the old file IDs that were received during the synch down and stored as the server snapshot 120 on the client device, thereby regenerating the client snapshot 140 of the file system 130 and the state of the file system 130 as known to the synchronization system 100.

Figure 8:
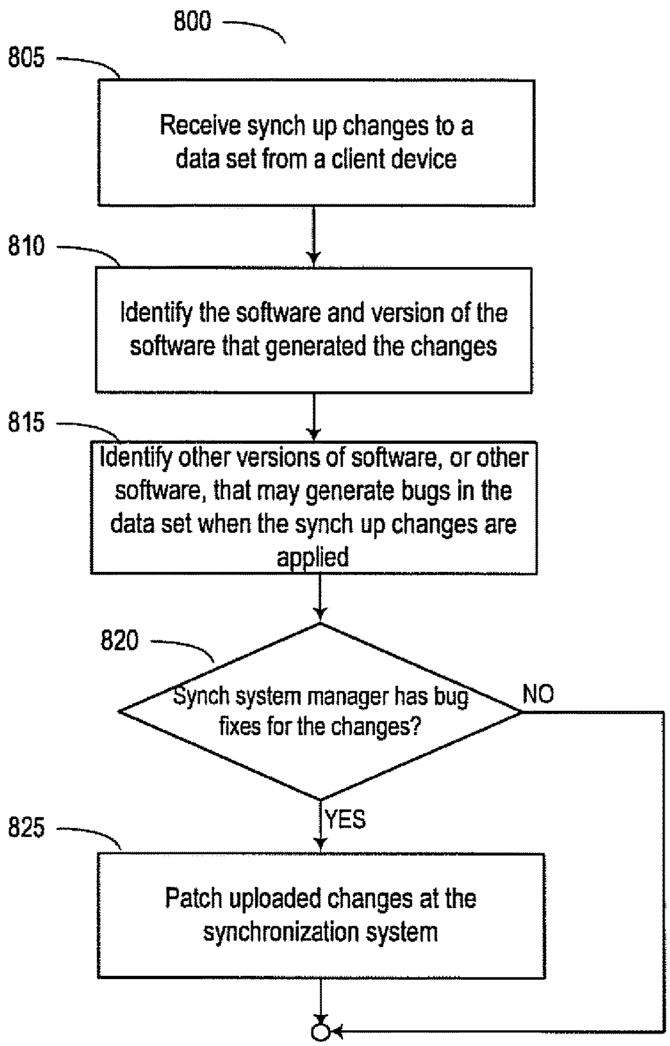
FIG. 8 illustrates a block diagram of a method of patching changes to a user data set that were synchronized up to the synchronization system.

FIG. 8 illustrates, in block form, a method 800 of patching changes to a user data set that were synchronized up to the synchronization system 100.

In operation 805, the synchronization system 100 can receive changes to a user data set there were synchronized up from a client device 150. The synch up changes can include changes to content that were uploaded to the content server 170, of the user data set that was changed. The synch up changes can further include synch up metadata received by the metadata server 110 during a synch up operation.

In operation 810, the synchronization system 100 can identify the software, and the version of the software, that generated the changes that were received by the synchronization system 100 during a synch up operation. In one embodiment, the synchronization system 100 can determine the software, and the version of the software, from metadata received from the client device 150 during the synch up operation.

In operation 815, the synchronization system 100 can identify that the changes synch'd up in operation 805 are to be applied to a user data set that was generated using a different version of the software used by the client to generate the synch'd up changes in operation 805. In one embodiment, the software that generated the synch changes in operation 805 can be a different software than the software used to generate the user data to which the synch up changes will be applied at the synchronization system 100.

In operation 820, the synchronization system 100 can determine whether the synchronization system manager 160 has bug fixes that can patch the synch up changes of operation 805 and the user data set to which the synch up changes will be applied.

If, in operation 820, the synchronization system manager 160 does have bug fixes that can patch the synch up changes to the latest version of the software that generated the changes, and still be compatible with the software that generated the synch changes, the synchronization system patches the synch up changes.

In one embodiment, in operations 815 and 820, rather than determining the latest version available of the software that generated the synch up changes (which the user may not have), the synchronization system can determine the highest version of the software that generated the synch up changes across all devices that the user has used in any synch up from any device with the synchronization system. The synchronization system manager can then identify any bug fixes that may be available to patch differences between the synch up changes and the highest version that the user has on all devices, and can patch the synch up changes accordingly.

Figure 9:
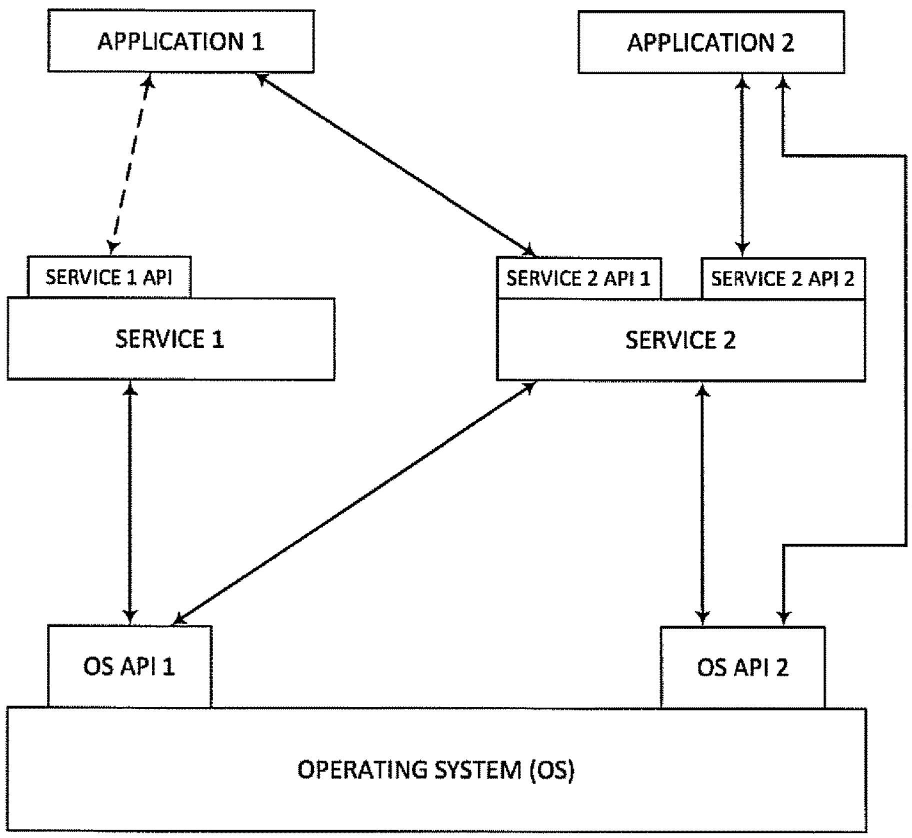
FIG. 9 illustrates an exemplary embodiment of a software stack usable in some embodiments.

In FIG. 9 ("Software Stack"), an exemplary embodiment, applications can make calls to Services A or B using several Service APIs and to Operating System (OS) using several as APIs, A and B can make calls to as using several as APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 10:
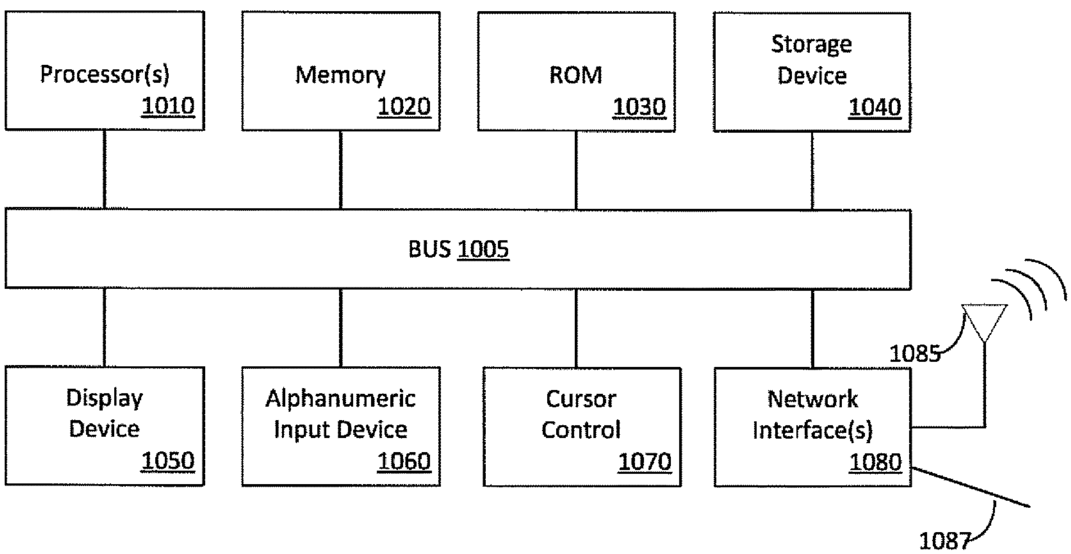
FIG. 10 is a block diagram of one embodiment of a computing system for use in some embodiments.

FIG. 10 is a block diagram of one embodiment of a computing system 1000. The computing system illustrated in FIG. 10 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems, gaming devices, or other consumer electronic devices. Alternative computing systems may include more, fewer and/or different components. The computing system of FIG. 10 may be used to provide the client device and/or the server device.

Computing system 1000 includes bus 1005 or other communication device to communicate information, and processor 1010 coupled to bus 1005 that may process information.

While computing system 1000 is illustrated with a single processor, computing system 1000 may include multiple processors and/or co-processors 1010. Computing system 1000 further may include random access memory (RAM) or other dynamic storage device 1020 (referred to as main memory), coupled to bus 1005 and may store information and instructions that may be executed by processor(s) 1010. Main memory 1020 may also be used to store temporary variables or other intermediate information during execution of instructions by processor 1010.

Computing system 1000 may also include read only memory (ROM) and/or other static storage device 1040 coupled to bus 1005 that may store static information and instructions for processor(s) 1010. Data storage device 1040 may be coupled to bus 1005 to store information and instructions. Data storage device 1040 such as flash memory or a magnetic disk or optical disc and corresponding drive may be coupled to computing system 1000.

Computing system 1000 may also be coupled via bus 1005 to display device 1050, such as a cathode ray tube (CRT) or liquid crystal display (LCD), or a touch screen to display information to a user. Computing system 1000 can also include an alphanumeric input device 1060, including alphanumeric and other keys, which may be coupled to bus 1005 to communicate information and command selections to processor(s) 1010. Another type of user input device is cursor control 1070, such as a touchpad, a mouse, a trackball, or cursor direction keys to communicate direction information and command selections to processor(s) 1010 and to control cursor movement on display 1050.

Computing system 1000 further may include one or more network interface(s) 1080 to provide access to a network, such as a local area network. Network interface(s) 1080 may include, for example, a wireless network interface having antenna 1085, which may represent one or more antenna(e). Computing system 1000 can include multiple wireless network interfaces such as a combination of WiFi, Bluetooth and cellular telephony interfaces. Network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, network interface(s) 1080 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method practiced on a client device comprising two synchronization engines, the method comprising:

receiving, by the client device, a synchronization token for a user data set to synchronize down from a synchronization service to the client device, the receiving based at least in part on one or more synchronization preferences specified by the client device being met;

in response to receiving the synchronization token and determining that the received synchronization token is more recent than a corresponding synchronization token for the data set on the client device:

receiving, from the synchronization service, by the client device utilizing a first synchronization engine, a first snapshot of user data stored by a remote storage service, wherein timing of the receiving is dynamically adjustable by the synchronization service based on a first set of conditions that include whether one or more synchronization preferences of the client device coincide with a determination by the synchronization service that a synchronize down operation is needed, independent from the synchronization service detecting a change to user data at the remote storage service;

storing the first snapshot of the user data in a first database on the client device;

downloading content corresponding to one or more differences between the user data on the remote storage service and the user data on the client device file system;

updating a file system on the client device with the downloaded content to reflect one or more differences between the user data on the remote storage service and the user data on the file system, as indicated in the first snapshot;

generating a second snapshot of the user data from the file system on the client device;

storing the second snapshot in a second database on the client device, the second database different from the first database; and transmitting the second snapshot in the second database on the client device to the remote storage service, utilizing a second synchronization engine, for processing by the synchronization service, wherein timing of the transmitting to the remote storage service is dynamically determined by the client device based on a second set of conditions, different from the first set of conditions.

2. The method of claim 1, further comprising:

updating the second snapshot of the user data in response to one or more changes to the file system on the client device.

3. The method of claim 2, wherein:

transmitting the updated second snapshot of the user data to the remote storage service for processing by the remote storage service is in response to one or more conditions of the second set of conditions being met.

4. The method of claim 3, further comprising:

uploading content associated with changes in the updated second snapshot of the user data, the uploading of the content being performed before transmitting the updated second snapshot.

5. The method of claim 1, further comprising:

receiving, from the remote storage service, by the client device, an update to the first snapshot of the user data stored by the remote storage service, wherein the update to the first snapshot includes at least one change to the user data stored by the remote storage service;

updating the first snapshot stored in the first database with the update to the first snapshot received from the remote storage service; and updating the file system on the client device to reflect the at least one change to the user data stored by the remote storage server that is included in the updated first snapshot received from the remote storage service.

6. The method of claim 1, wherein the first snapshot of user data comprises synchronization metadata including: a tag for each file or directory in the user data that identifies a specific version of the metadata for a document or directory, one or more file identifiers for each file or directory, and a hash of each file or directory.

7. The method of claim 6, wherein the one or more file identifiers for each file or directory comprise a universally unique file identifier.

8. The method of claim 1, further comprising:

transmitting, by the client device to a synchronization service, synchronize down frequency preference information comprising one or more synchronize down preferences;

wherein synchronize down preference information includes one or more of: a specified number of items to be synchronized down being met, or a quality of service of a communication line between the client device and the synchronization service being met, and wherein the synchronization down timing is dynamically adjustable by the synchronization service to a timing that differs from the synchronize down preference information.

9. The method of claim 1 wherein:

at least one of the one or more synchronization preferences of the client device is overridden by the synchronization service.

10. The method of claim 1, wherein the downloaded content is converted by the synchronization service to a format that is compatible with one or more applications on the client device, prior to the client downloading the content.

11. The method of claim 1, wherein the first snapshot includes metadata describing a state of synchronization of the user data stored on the remote storage service.

12. A non-transitory computer readable medium programmed with executable instructions that, when executed by a processing system, perform operations that implement two synchronization engines on a client device, the operations comprising:

receiving, by the client device, a synchronization token for a user data set to synchronize down from a synchronization service to the client device, the receiving based at least in part on one or more synchronization preferences specified by the client device being met;

in response to receiving the synchronization token and determining that the received synchronization token is more recent than a corresponding synchronization token for the data set on the client device:

receiving, from the synchronization service, by the client device utilizing a first synchronization engine, a first snapshot of user data stored by a remote storage service, wherein timing of the receiving is dynamically adjustable by the synchronization service based on a first set of conditions that include whether one or more synchronization preferences of the client device coincide with a determination by the synchronization service that a synchronize down operation is needed, independent from the synchronization service detecting a change to user data at the remote storage service;

storing the first snapshot of the user data in a first database on the client device;

downloading content corresponding to one or more differences between the user data on the remote storage service and the user data on the client device file system;

updating a file system on the client device with the downloaded content to reflect one or more differences between the user data on the remote storage service and the user data on the file system, as indicated in the first snapshot;

generating a second snapshot of the user data from the file system on the client device;

storing the second snapshot in a second database on the client device, the second database different from the first database; and transmitting the second snapshot in the second database on the client device to the remote storage service, utilizing a second synchronization engine, for processing by the synchronization service, wherein timing of the transmitting to the remote storage service is dynamically determined by the client device based on a second set conditions different from the first set of conditions.

13. The medium of claim 12, further comprising:

updating the second snapshot of the user data in response to one or more changes to the file system on the client device.

14. The medium of claim 13, wherein transmitting the updated second snapshot of the user data to the remote storage service for processing by the remote storage service is in response to one or more conditions of the second set of conditions being met.

15. The medium of claim 14, further comprising:

uploading content associated with changes in the updated second snapshot of the user data, the uploading of the content being performed before transmitting the updated second snapshot.

16. The medium of claim 12, further comprising:

receiving, from the remote storage service, by the client device, an update to the first snapshot of the user data stored by the remote storage service, wherein the update to the first snapshot includes at least one change to the user data stored by the remote storage service;

updating the first snapshot stored in the first database with the update to the first snapshot received from the remote storage service; and updating the file system on the client device to reflect the at least one change to the user data stored by the remote storage server that is included in the updated first snapshot received from the remote storage service.

17. The medium of claim 12, wherein the first snapshot of user data comprises synchronization metadata including: a tag for each file or directory in the user data that identifies a specific version of the metadata for a document or directory, one or more file identifiers for each file or directory, and a hash of each file or directory.

18. The medium of claim 17, wherein the one or more file identifiers for each file or directory comprise a universally unique file identifier.

19. A system comprising:

a processing system programmed with executable instructions that, when executed, perform operations that implement two synchronization engines on a client device, the operations comprising:

receiving, by the client device, a synchronization token for a user data set to synchronize down from a synchronization service to the client device, the receiving based at least in part on one or more synchronization preferences specified by the client device being met;

in response to receiving the synchronization token and determining that the received synchronization token is more recent than a corresponding synchronization token for the data set on the client device:

receiving, from the synchronization service, by the client device utilizing a first synchronization engine, a first snapshot of user data stored by a remote storage service, wherein timing of the receiving is dynamically adjustable by the synchronization service based on a first set of conditions that include whether one or more synchronization preferences of the client device coincide with a determination by the synchronization service that a synchronize down operation is needed, independent from the synchronization service detecting a change to user data at the remote storage service;

storing the first snapshot of the user data in a first database on the client device;

downloading content corresponding to one or more differences between the user data on the remote storage service and the user data on the client device file system;

updating a file system on the client device with the downloaded content to reflect one or more differences between the user data on the remote storage service and the user data on the file system, as indicated in the first snapshot;

generating a second snapshot of the user data from the file system on the client device;

storing the second snapshot in a second database on the client device, the second database different from the first database; and transmitting the second snapshot in the second database on the client device to the remote storage service, utilizing a second synchronization engine, for processing by the synchronization service, wherein timing of the transmitting to the remote storage service is dynamically determined by the client device based on a second set of conditions, different from the first set of conditions.

20. The system of claim 19, further comprising:

updating the second snapshot of the user data in response to one or more changes to the file system on the client device.

21. The system of claim 20, wherein transmitting the updated second snapshot of the user data to the remote storage service for processing by the remote storage service is in response to one or more conditions of the second set of conditions being met.

22. The system of claim 21, further comprising:

uploading content associated with changes in the updated second snapshot of the user data, the uploading of the content being performed before transmitting the updated second snapshot.

23. The system of claim 19, further comprising:

receiving, from the remote storage service, by the client device, an update to the first snapshot of the user data stored by the remote storage service, wherein the update to the first snapshot includes at least one change to the user data stored by the remote storage service;

updating the first snapshot stored in the first database with the update to the first snapshot received from the remote storage service; and updating the file system on the client device to reflect the at least one change to the user data stored by the remote storage server that is included in the updated first snapshot received from the remote storage service.

24. The system of claim 19, wherein the first snapshot of user data comprises synchronization metadata including: a tag for each file or directory in the user data that identifies a specific version of the metadata for a document or directory, one or more file identifiers for each file or directory, and a hash of each file or directory.

25. The system of claim 24, wherein the one or more file identifiers for each file or directory comprise a universally unique file identifier.

* * * * *